(12) United States Patent
Kang et al.

(10) Patent No.: US 11,774,170 B2
(45) Date of Patent: Oct. 3, 2023

(54) REFRIGERATOR

(71) Applicant: Samsung Electronics Co., Ltd., Suwon-si (KR)

(72) Inventors: Wan-Ku Kang, Suwon-si (KR); Hyun Uk Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 17/250,911

(22) PCT Filed: Sep. 23, 2019

(86) PCT No.: PCT/KR2019/012347
§ 371 (c)(1),
(2) Date: Mar. 25, 2021

(87) PCT Pub. No.: WO2020/071673
PCT Pub. Date: Apr. 9, 2020

(65) Prior Publication Data
US 2021/0341215 A1 Nov. 4, 2021

(30) Foreign Application Priority Data
Oct. 2, 2018 (KR) .................. 10-2018-0117281

(51) Int. Cl.
*F25D 25/02* (2006.01)
*A47B 57/58* (2006.01)

(52) U.S. Cl.
CPC ............ *F25D 25/02* (2013.01); *A47B 57/585* (2013.01); *A47B 2210/175* (2013.01)

(58) Field of Classification Search
CPC ...... F25D 23/069; F25D 25/025; F25D 25/02; F25D 27/005; A47B 88/975;
(Continued)

(56) References Cited

U.S. PATENT DOCUMENTS

| 2,472,593 A | * | 6/1949 | King | ..... | A47B 88/487 |
| | | | | | 384/49 |
| 2,655,422 A | * | 10/1953 | Gussack | ..... | A47B 88/48 |
| | | | | | 312/333 |

(Continued)

FOREIGN PATENT DOCUMENTS

| CN | 206410424 U | 8/2017 |
| CN | 108253722 | * 7/2018 |

(Continued)

OTHER PUBLICATIONS

International Search Report and Written Opinion of the International Searching Authority in connection with International Application No. PCT/KR2019/012347 dated Jan. 22, 2020, 9 pages.

(Continued)

*Primary Examiner* — Janet M Wilkens

(57) ABSTRACT

Provided is a refrigerator. The refrigerator includes a main body provided to form a storage chamber, a storage container configured to be inserted into or withdrawn from the storage chamber, and having a storage space, a divider configured to be movable with respect to the storage container to divide the storage space, a support shaft arranged in the storage container and configured to guide movement of the divider, and a guide device configured to movably support the divider, and having a plurality of ball bearings arranged to roll with respect to the support shaft.

12 Claims, 11 Drawing Sheets

(58) Field of Classification Search
CPC ..... A47B 88/981; A47B 96/04; A47B 57/585;
A47B 2210/175
USPC .... 312/408, 402, 404, 348.3, 330.1; 108/60,
108/61
See application file for complete search history.

(56) References Cited

U.S. PATENT DOCUMENTS

| | | | |
|---|---|---|---|
| 2,881,040 A * | 4/1959 | Virginia | A47B 77/10 |
| | | | 182/35 |
| 8,590,992 B2 * | 11/2013 | Lim | F25D 23/065 |
| | | | 312/348.3 |
| 10,451,339 B1 * | 10/2019 | Wantland | F25D 23/069 |
| 11,306,964 B2 * | 4/2022 | Park | A47B 88/975 |
| 2010/0319391 A1 * | 12/2010 | Lim | A47B 88/975 |
| | | | 62/449 |
| 2013/0063014 A1 * | 3/2013 | Chen | A47B 88/90 |
| | | | 312/348.3 |
| 2015/0069066 A1 | 3/2015 | Choi et al. | |
| 2015/0216303 A1 | 8/2015 | Rehage et al. | |
| 2019/0357679 A1 * | 11/2019 | Li | F25D 25/022 |
| 2021/0063073 A1 * | 3/2021 | Song | F25D 25/025 |
| 2021/0341218 A1 * | 11/2021 | Wei | F25D 25/025 |
| 2022/0034579 A1 * | 2/2022 | Park | F25D 23/069 |

FOREIGN PATENT DOCUMENTS

| | | | |
|---|---|---|---|
| CN | 108278806 A | | 7/2018 |
| CN | 109708359 | * | 5/2019 |
| CN | 208817848 | * | 5/2019 |
| CN | 109708411 | * | 12/2020 |
| CN | 112384743 | * | 2/2021 |
| DE | 1940731 | * | 4/1978 |
| DE | 202009015649 U1 | | 4/2011 |
| EP | 3679834 | * | 7/2020 |
| JP | 2005241209 A | | 9/2005 |
| JP | 4200315 B2 | | 12/2008 |
| KR | 10-0484660 B1 | | 4/2005 |
| KR | 20070025348 A | | 3/2007 |
| KR | 20100098021 A | | 9/2010 |
| KR | 20100137342 A | | 12/2010 |
| KR | 101199975 B1 | | 11/2012 |
| KR | 10-2015-0029785 A | | 3/2015 |
| KR | 10-2015-0062662 A | | 6/2015 |
| KR | 10-2015-0073540 A | | 7/2015 |
| KR | 10-2016-0046123 A | | 4/2016 |
| KR | 10-1644018 B1 | | 8/2016 |
| KR | 20160114869 A | | 10/2016 |
| KR | 10-1700501 B1 | | 1/2017 |
| KR | 101838029 B1 | | 3/2018 |
| KR | 20180062122 | * | 6/2018 |
| KR | 102120103 | * | 6/2020 |

OTHER PUBLICATIONS

European Patent Office, "Supplementary European Search Report," dated Feb. 7, 2023, in connection with European Patent Application No. 19869588.4, 7 pages.

Korean Intellectual Property Office, "Office Action," dated Jun. 13, 2023, in connection with Korean Patent Application No. 10-2018-0117281, 23 pages.

European Patent Office, "Supplementary European Search Report," dated Sep. 16, 2021, in connection with European Patent Application No. 19869588.4, 10 pages.

\* cited by examiner

REFRIGERATOR

CROSS-REFERENCE TO RELATED APPLICATIONS

This application is a 371 National Stage of International Application No. PCT/KR2019/012347 filed Sep. 23, 2019, which claims priority to Korean Patent Application No. 10-2018-0117281 filed Oct. 2, 2018, the disclosures of which are herein incorporated by reference in their entirety.

BACKGROUND

1. Field

The disclosure relates to a refrigerator, and more specifically, to a refrigerator having a storage container.

2. Description of Related Art

A refrigerator is a home appliance that is equipped with a main body having a storage chamber and a cold air supply device provided to supply cold air to the storage chamber, and stores food in a fresh state. The storage chamber includes a refrigerating chamber maintained at about 0° C. to 5° C. to store food refrigerated, and a freezing chamber maintained at about 0° C. to −30° C. to store food frozen. In general, the storage chamber is provided to have a front side that is opened for insertion/withdrawal of food, and the open front side of the storage chamber is opened and closed by a door.

The storage chamber is equipped with a shelf on which food may be placed. The storage chamber is provided to have a front side that is open so that food may be inserted and withdrawn therethrough, and the open front side of the storage chamber may be opened and closed by a door rotatably coupled to the main body. The door is provided on a rear side thereof with a door pocket for storing food, in addition to the shelf disposed in the storage chamber.

The refrigerator is in the trend of becoming larger in the capacity of storage as the daily life diversifies, and the large sized refrigerator may include a storage container provided to be withdrawn and inserted to store vegetables and fruits. The storage container has a storage space in which food is stored, and in recent years, the storage container has been developed toward dividing the storage space to maintain an orderly state by preventing different types of food from being mixed in the storage space.

SUMMARY

Therefore, it is an object of the disclosure to provide a refrigerator capable of smoothly moving a divider provided to divide a storage space of a storage container.

It is another object of the disclosure to provide a refrigerator capable of fixing the position of a divider provided to divide a storage space of a storage container.

According to an aspect of the disclosure, there is provided a refrigerator including: a main body provided to form a storage chamber; a storage container configured to be inserted into or withdrawn from the storage chamber, and having a storage space; a divider configured to be movable with respect to the storage container to divide the storage space; a support shaft arranged in the storage container and configured to guide movement of the divider; and a guide device configured to movably support the divider, and having a plurality of ball bearings arranged to roll with respect to the support shaft.

The guide device may include a first guide device arranged at one end of the divider and a second guide device disposed at an other end opposite to the one end of the divider.

The guide device may include: a guide body formed to extend along a moving direction of the divider and having a plurality of ball insertion portion into which the plurality of ball bearings are inserted; and a ball cover coupled to the guide body to cover the plurality of ball bearings inserted into the plurality of ball insertion portions.

The plurality of ball bearings may be arranged along an outer circumferential surface of the support shaft to surround the support shaft.

A lubricating oil may be provided on outer surfaces of the plurality of ball bearings or an outer surface of the support shaft.

The refrigerator may further include: a fixing portion arranged on an inner side surface of the storage container; and a stopper configured to be fixed to or released from the fixing portion.

The fixing portion may extend in a same direction as a direction in which the support shaft extends.

The refrigerator may further include a lever configured to move the stopper by being moved with respect to the divider.

The divider may include a push latch device configured to be selectively coupled to the lever, wherein the lever may be configured to: when coupled to the push latch device, move the stopper in a direction to be fixed to the fixing portion, and when separated from the push latch device, move the stopper in a direction to be released from the fixed portion.

The lever may include: a latch protrusion formed to protrude to be inserted into the push latch device; and a push portion configured to come in contact with a portion of the stopper to press the stopper or be pressed by the stopper.

The refrigerator may further include a stopper elastic member arranged to apply an elastic force to the stopper in a direction in which the stopper is released from the fixing portion.

The divider may include a power transmission device configured to transmit a driving force of the lever to the stopper, and the lever may be provided to be movable along a direction in which the divider extends, wherein the power transmission device may be configured to: move the stopper in a direction to be fixed to the fixing portion when the lever moves in a first direction, and move the stopper in a direction to be released from the fixing portion when the lever moves in a second direction opposite to the first direction.

The power transmission device may include: a first gear provided to rotate according to movement of the lever; and a gear module configured to engage with and rotate relative to the first gear, and connected to the stopper to move the stopper.

The stopper may include a first stopper head arranged at one end of the divider and a second stopper head arranged at an other end opposite to the one end of the divider, and the fixing portion may include a first fixing portion arranged to face the first stopper head and a second fixing portion arranged to face the second stopper head, wherein the second gear module may include: a second gear configured to engage with and rotate relative to the first gear to transmit a force to the first stopper head to move the first stopper head in a direction to be fixed to or released from the first fixing portion; and a third gear configured to engage with and rotate relative to the second gear to transmit a force to the second stopper head to move the second stopper head in a direction to be fixed to or released from the second fixing portion.

The refrigerator may further include a support elastic member arranged to apply an elastic force to the first stopper head and the second stopper head in a direction in which the first stopper head and the second stopper head are fixed to the first fixing portion and the second fixing portion, respectively.

According to another aspect of the disclosure, there is provided a refrigerator including: a main body configured to form a storage chamber; a storage container configured to be inserted into or withdrawn from the storage chamber, and having a storage space; a divider configured to be movable with respect to the storage container to divide the storage space; a support shaft arranged in the storage container and configured to guide movement of the divider; a guide device configured to movably support the divider, and having a plurality of ball bearings arranged to roll with respect to the support shaft; a fixing portion arranged on an inner side surface of the storage container, and extending in a same direction in which the support shaft extends; and a stopper configured to be selectively fixed to or released from the fixing portion.

The guide device may include: a guide body formed to extend along a moving direction of the divider and provided at each end portion with a plurality of ball insertion portion into which the plurality of ball bearings are inserted; and a ball cover coupled to each end portion of the guide body to cover the plurality of ball bearings inserted into the plurality of ball insertion portions.

The plurality of ball bearings may be arranged to roll with respect to the support shaft and the plurality of ball insertion portions.

The refrigerator may further include a lever arranged to have at least a portion exposed to the outside of the divider, and configured to move with respect to the divider to move the stopper in a direction to be fixed to or released from the fixing portion.

According to still another aspect of the disclosure, there is provided a refrigerator including: a main body configured to form a storage chamber; a storage container configured to be inserted into or withdrawn from the storage chamber, and having a storage space; a divider configured to be movable with respect to the storage container to divide the storage space; a guide device having a plurality of ball bearings that movably support the divider; a fixing portion formed to extend along an inner side surface of the storage container and having an uneven shape; and a stopper head having a shape corresponding to the uneven shape of the fixing portion to be selectively fixed to the fixing portion.

As is apparent from the above, the refrigerator can allow a divider to perform smooth movement by a driving device of a divider that is configured to roll on a support shaft of a storage container.

The refrigerator can easily fix the position of a divider by allowing a stopper of the divider to be fixed to a fixing portion provided on an inner side surface of a storage container.

DETAILED DESCRIPTION

Figure 1:
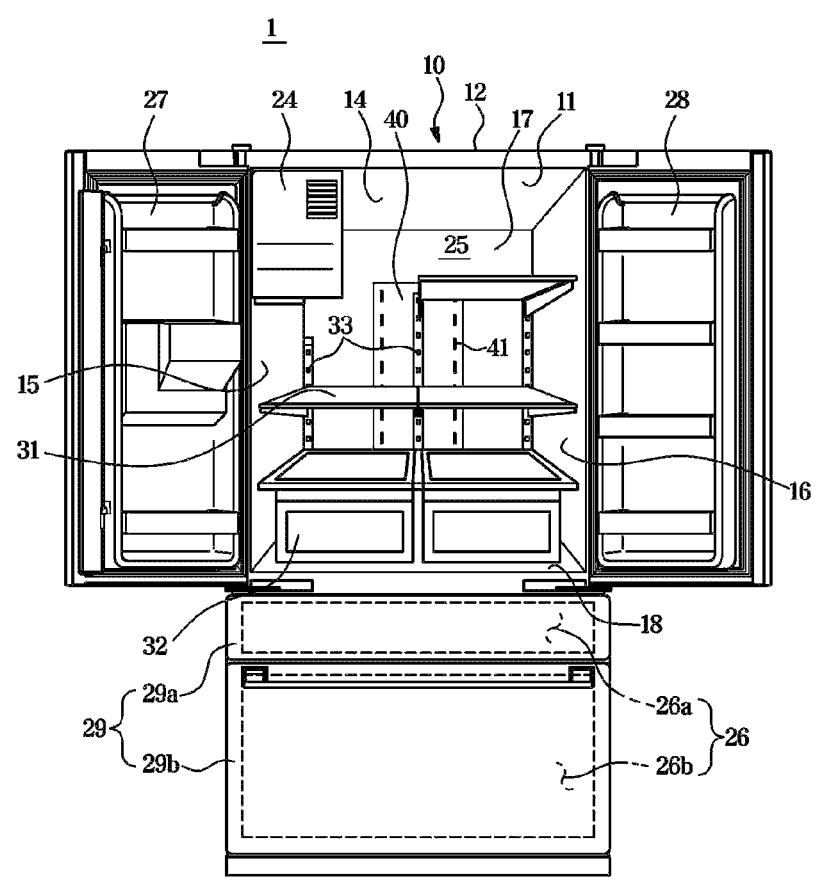
FIG. 1 is a front view illustrating a refrigerator according to an embodiment of the disclosure.

Embodiments and features as described and illustrated in the disclosure are only preferred examples, and various modifications thereof may also fall within the scope of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

Hereinafter, embodiments of the disclosure will be described in detail with reference to the accompanying drawings.

FIG. 1 is a front view illustrating a refrigerator according to an embodiment of the disclosure.

Referring to FIG. 1, a refrigerator 1 includes a main body 10 forming the storage chambers 25 and 26, doors 27, 28, and 29 provided to open and close the storage chambers 25 and 26, and a cold air supply device provided to supply cold air to the storage chambers 25 and 26. The cold air supply device may include an evaporator, a compressor, a condenser, and an expansion device, and generate cold air using the latent heat of evaporation of a refrigerant.

The main body 10 includes an inner case 11 forming the storage chambers 25 and 26, an outer case 12 coupled to the outside of the inner case 11 to form an external appearance, and an insulating material (not shown) provided between the inner case 11 and the outer case 12. (Original) In another aspect, the main body 10 may include an upper wall 14, a lower wall, a left wall 15, a right wall 16, a rear wall 17, and an intermediate wall 18.

The storage chambers 25 and 26 may be divided in an upper and lower direction by the intermediate wall 18. The upper storage chamber 25 may be used as a refrigerating chamber maintained at substantially 0 to 5 degrees Celsius to keep food in a refrigerated state, and the lower storage chamber 26 may be used as a freezing chamber maintained at substantially−30 to 0 degrees Celsius to keep food in a frozen state The lower storage chamber 26 may include a first lower storage chamber 26a disposed below the upper storage chamber 25 and a second lower storage chamber 26b disposed below the first lower storage chamber 26a. The first lower storage chamber 26a and the second lower storage chamber 26b may be divided from each other to store different foods.

The storage chambers 25 and 26 are provided to have a front side that is open so that food may be inserted and withdrawn therethrough, and the storage chambers 25 and 26 may be opened and closed by the doors 27, 28 and 29. The upper storage chamber 25 may be opened and closed by a pair of rotating doors 27 and 28 rotatably coupled to the main body 10, and the lower storage chamber 26 may be opened and closed by a drawer door 29 which is slidably inserted and withdrawn.

The drawer door 29 may include a first drawer door 29a for opening and closing the first lower storage chamber 26a and a second drawer door 29b for opening and closing the second lower storage chamber 26b.

The upper storage chamber 25 may be provided therein with an ice making device 24 for generating ice.

The upper storage chamber 25 may be provided therein with a shelf 31 on which food is placed and a sealing container 32 for keeping food in a sealed state. A shelf support portion 33 may be provided at a rear side of the upper storage chamber 25 to support the shelf 31, and the shelf 31 may be coupled to and supported by the shelf support portion 33. In detail, a rear end of the shelf 31 may be coupled to and supported by the shelf support portion 33, and a front end of the shelf 31 may be maintained in an unfixed state.

The shelf support portion 33 may be installed on the rear wall 17 of the main body 10 and/or a duct cover 40. The duct cover 40 may be installed on the rear wall 17 to form a cold air passage (not shown) for supplying cold air to the upper storage chamber 25. Cold air formed by the cold air supply device may be supplied to the upper storage chamber 25 through a cold air passage.

The duct cover 40 may be formed of a discharge hole 41 for supplying cold air from the cold air passage to the upper storage chamber 25. The shelf support portion 33 may be installed on the duct cover 40.

The first lower storage chamber 26a may have a storage container 100 arranged therein. The storage container 100 may be disposed behind the first drawer door 29a. The storage container 100 may be configured to be inserted into or withdrawn from the first lower storage chamber 26a. As the first drawer door 29a is opened and closed, the storage container 100 may be inserted into or withdrawn from the first lower storage chamber 26a. The storage container 100 may include a storage space 101 formed to store food therein.

Figure 2:
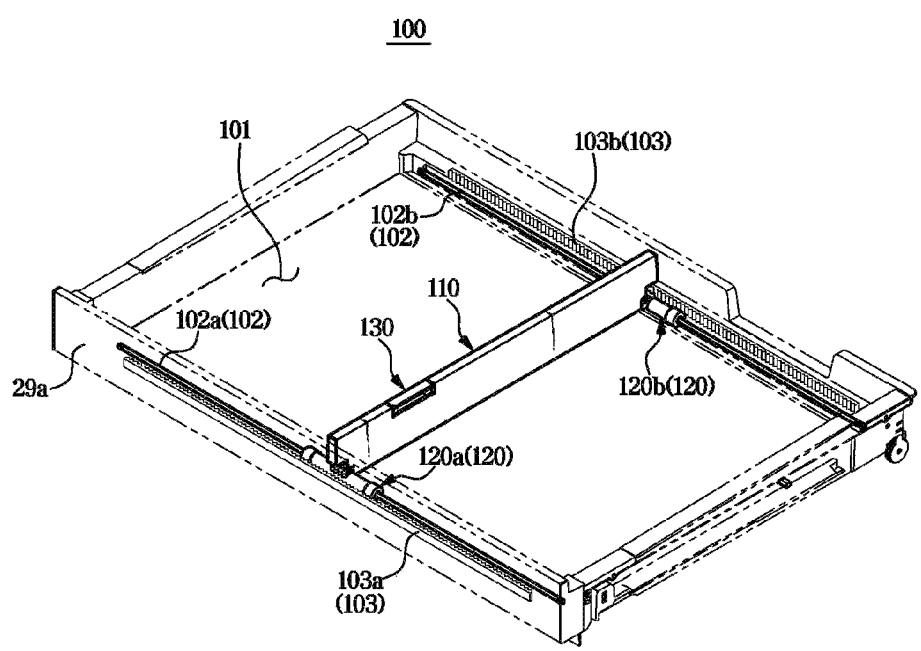
FIG. 2 is a diagram illustrating a storage container disposed in a first lower storage chamber shown in FIG. 1.
Figure 3:
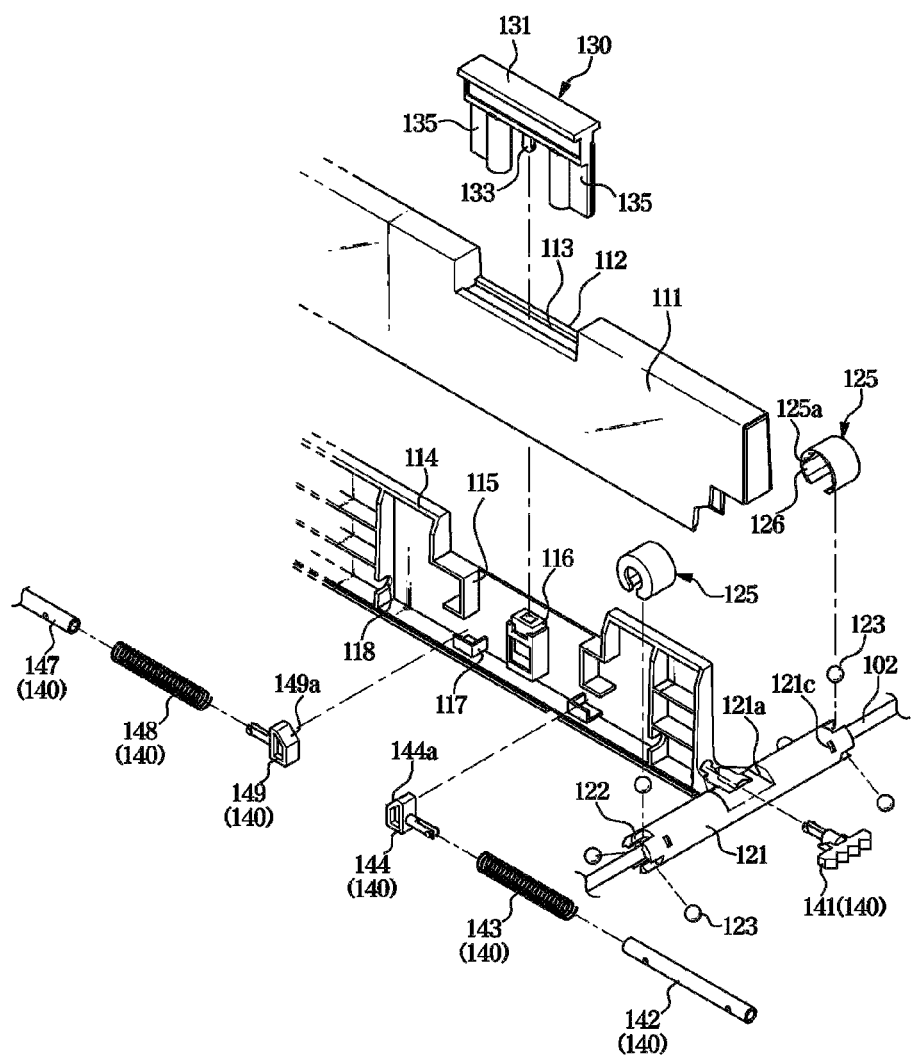
FIG. 3 is an exploded view illustrating a divider shown in FIG. 2.
Figure 4:
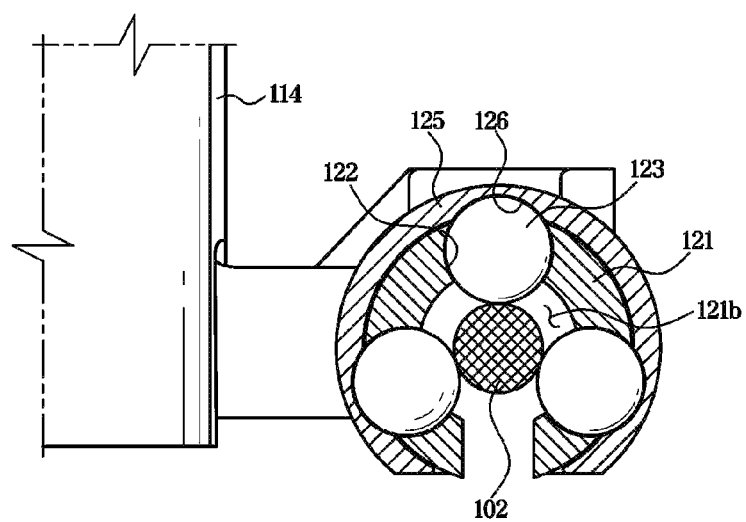
FIG. 4 is a cross sectional view illustrating a divider driving device shown in FIG. 2.
Figure 5:
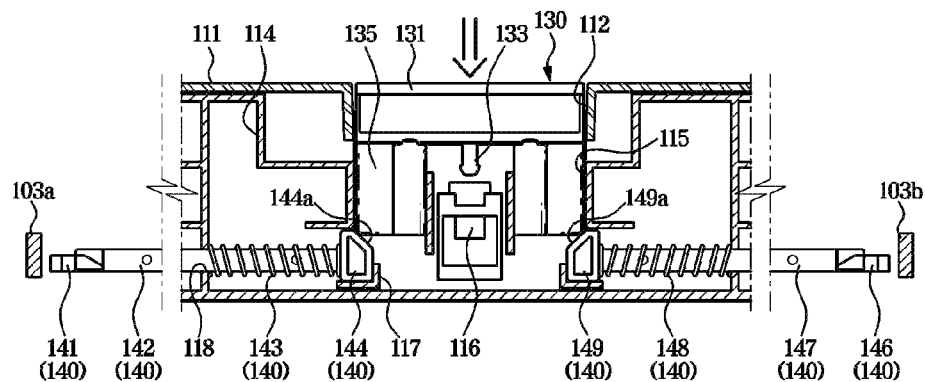
FIG. 5 is a view illustrating an internal structure of the divider shown in FIG. 2 in a state in which the divider is released from a storage container.
Figure 6:
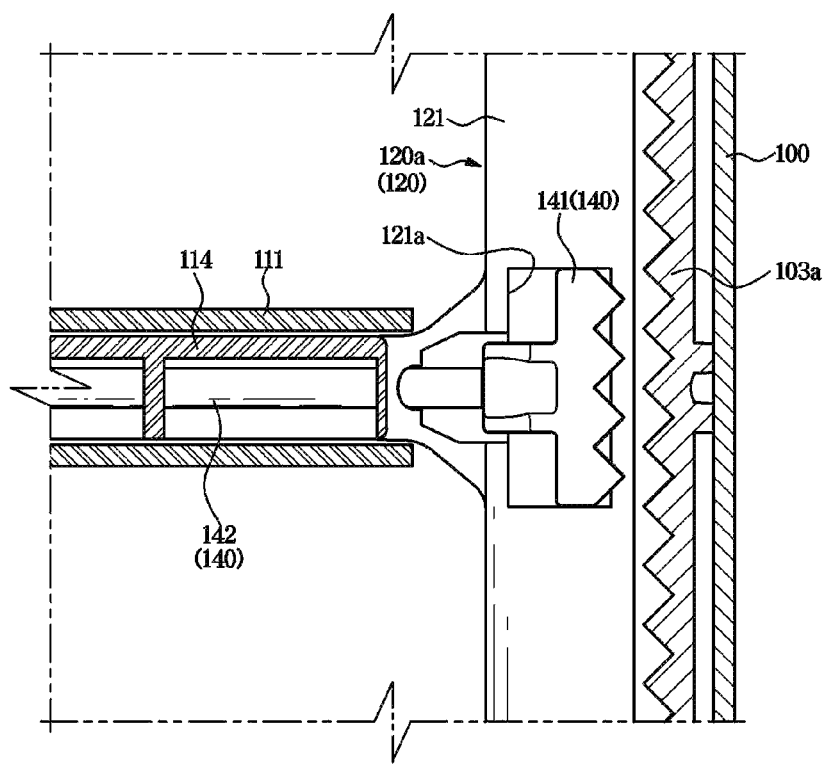
FIG. 6 is a view illustrating a state of a stopper of the divider and a fixing portion of the storage container shown in FIG. 5, which is viewed from the above.
Figure 7:
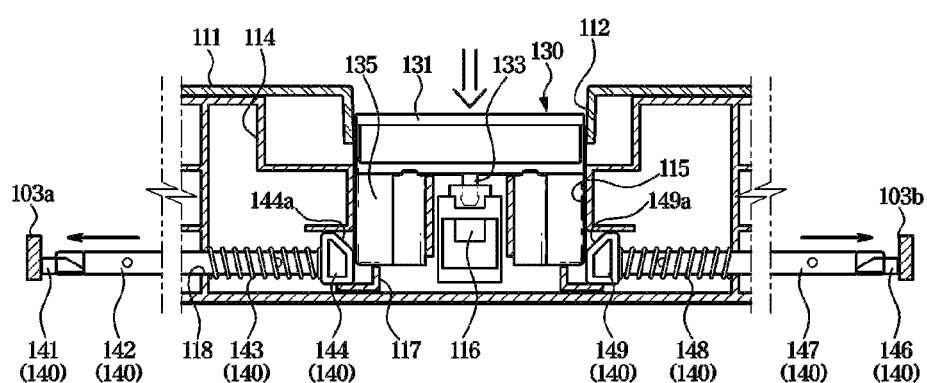
FIG. 7 is a view illustrating an internal structure of the divider shown in FIG. 2 in a state in which the divider is fixed to the storage container.
Figure 8:
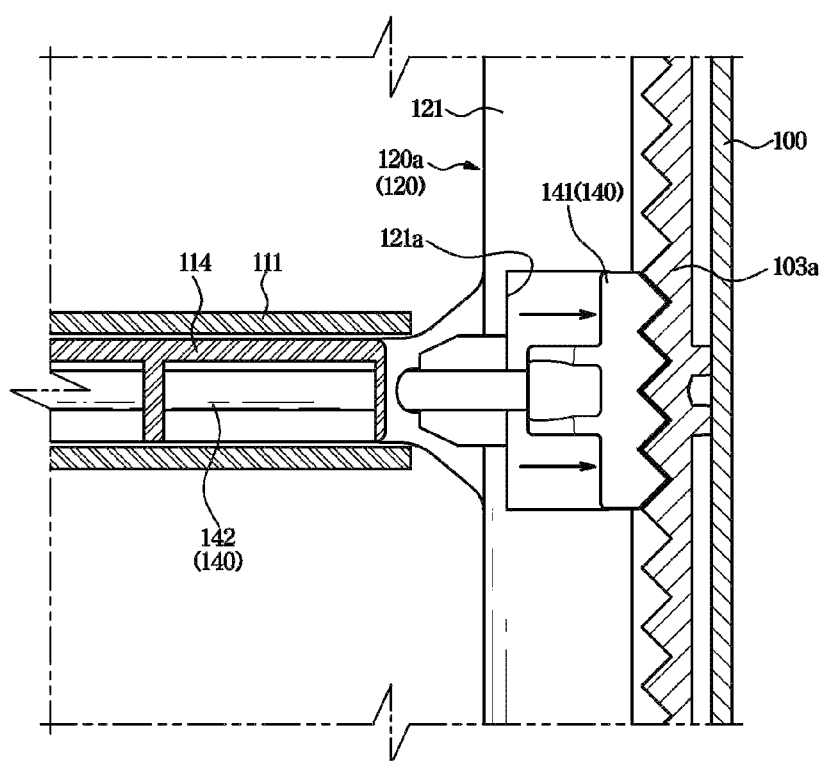
FIG. 8 is a view illustrating a stopper of the divider and a fixing portion of the storage container shown in FIG. 7, which is viewed from the above.

FIG. 2 is a diagram illustrating a storage container disposed in a first lower storage chamber shown in FIG. 1. (Original) FIG. 3 is an exploded view illustrating a divider shown in FIG. 2. (Original) FIG. 4 is a cross sectional view illustrating a divider driving device shown in FIG. 2. (Original) FIG. 5 is a view illustrating an internal structure of the divider shown in FIG. 2 when the divider is released from a storage container. FIG. 6 is a view illustrating a state of a stopper of the divider and a fixing portion of the storage container shown in FIG. 5, which is viewed from the above. FIG. 7 is a view illustrating an internal structure of the divider shown in FIG. 2 when the divider is fixed to a storage container. FIG. 8 is a view illustrating a stopper of the divider and a fixing portion of the storage shown in FIG. 7, which is viewed from the above.

Referring to FIGS. 2 and 3, the storage container 100 may include a divider 110 for dividing the storage space 101, a guide device 120 for movably supporting the divider 110, a support shaft 102 for guiding movement of the divider 110, and a fixing portion 103 for fixing the position of the divider 110.

The support shaft 102 may be disposed adjacent to an inner wall of the storage container 100. The support shaft 102 may extend along the moving direction of the divider 110. The support shaft 102 may be mounted on the inner wall of the storage container 100.

Although not shown, when the divider 110 is formed to extend in the left and right direction and movable in the front and rear direction, the support shaft 102 may extend in the front and rear direction, and may be disposed on each of left and right side inner walls of the storage container 100.

The support shafts 102 may be disposed on a front side inner wall and a rear side inner wall among the inner walls of the storage container 100, respectively, to support the movement of the divider 110 at both side ends of the divider 110. The support shaft 102 may include a first support shaft 102a disposed on the front side inner wall of the storage container 100 and a second support shaft 102b disposed on the rear side inner wall of the storage container 100.

Since the first support shaft 102a and the second support shaft 102b have the same configuration as each other, only the first support shaft 102a will be described for the sake of convenience of description, and the first support shaft 102a is referred to as the support shaft 102.

The fixing portion 103 may be disposed on the inner surface of the storage container 100. The fixing portion 103 may extend in the same direction as the direction in which the support shaft 102 extends. The fixing portion 103 may extend in the left and right directions. However, although not shown, when the divider 110 is formed to extend in the left and right direction and movable in the front and rear direction, the fixing portion 103 may extend in the front and rear direction, and may be disposed on each of the left and right side inner surfaces of the storage container 100.

The fixing portion 103 may be provided to be engaged with a stopper 140 to fix the divider 110. The fixing portion 103 may have an uneven shape to correspond to a stopper head 141 or 146 of the stopper 140. The fixing portion 103 may have a rack gear shape.

The fixing portion 103 may include a first fixing portion 103a disposed on a front inner surface of the storage container 100 and a second fixing portion 103b disposed on a rear inner surface of the storage container 100 such that the position of the divider 110 is fixed at the both sides of the divider 110.

Since the first fixing portion 103a and the second fixing portion 103b have the same configuration as each other, hereinafter, only the first fixing portion 103a will be described for the sake of convenience of description, and the first fixing portion 103a will be referred to as a fixing portion 103.

The divider 110 may be provided to be movable with respect to the storage container 100 to partition the storage space 101. The divider 110 may be formed to extend in a substantially front and rear direction to divide the storage space 101 in the left and right direction. On the other hand, although not shown, the divider 110 may be formed to extend in a substantially left and right direction to divide the storage space 101 in the front and rear direction. The divider 110 may include an outer case 111 and an inner case 114.

The outer case 111 may be provided to cover the inner case 114. The outer case 111 may accommodate the inner case 114 therein. The outer case 111 may be formed to extend in the substantially front and rear direction. The outer case 111 includes a lever mounting portion 112 on which a lever 130 is movably mounted, and a lever insertion hole 113 formed to allow a part of the lever 130 to be inserted into the outer case 111 therethrough.

The lever mounting portion 112 may be formed to allow a lever 230 to be mounted thereon while an upper surface of an exposed portion 131 of the lever 130 is disposed substantially coplanar with an upper surface of the outer case 111. The lever mounting portion 112 may be formed to guide the movement of the lever 130 in the upper and lower direction. The lever mounting portion 112 may be formed to extend along the direction in which the outer case 111 extends. The lever mounting portion 112 may be formed as a recession on the upper surface of the outer case 111.

The lever insertion hole 113 may be formed to allow a latch protrusion 133 and a push portion 135 of the lever 130 to be inserted into the outer case 111 therethrough. The lever insertion hole 113 may be formed in the bottom surface of the lever mounting portion 112. The lever insertion hole 113 may be formed to extend along the direction in which the lever mounting portion 112 extends. The lever insertion hole 113 may be formed to pass therethrough from the inside of the outer case 11 to the outside of the outer case 111.

The inner case 114 may be accommodated in the outer case 111. The inner case 114 may include a lever guide 115 for guiding the movement of the push portion 135 of the lever 130 in the upper and lower direction, a push latch device 116 configured to be selectively coupled to the lever 130, a movement limiting portion 117 for limiting the movement range of the stopper 140, and a stopper guide 118 for guiding the movement of the stopper 140.

The lever guide 115 may guide the movement of the push portion 135 of the lever 130 inserted into the outer case 111 through the lever insertion hole 113. The lever guide 115 may be formed corresponding in size to the size of the push portion 135.

The push latch device 116 may be configured to have the latch protrusion 133 of the lever 130 inserted thereto. The push latch device 116 may be configured to be coupled to the latch protrusion 133 when the exposed portion 131 of the lever 130 is pushed to cause the latch protrusion 133 to be inserted into the push latch device 116, and to be separated from the latch protrusion 133 when the exposed portion 131 of the lever 130 is pushed once again. Since such a push latch device 116 is a known technology, detailed description thereof will be omitted.

The movement limiting portions 117 may be disposed to interfere with stopper tails 144 and 149 of the stopper 140. The movement limiting portion 117 may be formed to protrude from the inner side bottom surface of the inner case 114 to limit movement of the stopper 140 in a direction that the stopper 140 is separated from the fixing portion 103.

The stopper guides 118 may guide the movement of stopper shafts 142 and 147 of the stopper 140. The stopper guides 118 may slidably support the stopper shafts 142 and 147.

The guide device 120 may include a first guide device 120a disposed at one end of the divider 110 and a second guide device 120b disposed at the other end opposite to the one end of the divider 110. The first guide device 120a may be disposed at the front end of the divider 110. The second guide device 120b may be disposed at the rear end of the divider 110. The first guide device 120a and the second guide device 120b may stably support sliding driving of the divider 110 at the both side ends of the divider 110. Since the first guide device 120a and the second guide device 120b have the same configuration as each other, hereinafter, only the first guide device 120a will be described for the sake of convenience of description, and the first guide device 120a will be referred to as a guide device 120.

The guide device 120 includes a guide body 121 formed to extend along the moving direction of the divider 110, a plurality of ball bearings 123 disposed to roll with respect to the support shaft 102, and a ball cover 125 coupled to the guide body 121 to prevent separation of the plurality of ball bearings 123.

The guide body 121 may be formed to extend from an end portion of the inner case 114 along a direction in which the support shaft 102 extends. The guide body 121 may be integrally formed with the inner case 114. However, although not shown, the guide body 121 may be provided separately from the inner case 114 and mounted on the end portion of the inner case 114.

The guide body 121 may include a plurality of ball insertion portions 122 into which the plurality of ball bearings 123 are inserted. The plurality of ball insertion portions 122 may support the plurality of ball bearings 123 to perform rolling. The plurality of ball insertion portions 122 may be provided corresponding in number to the number of the plurality of ball bearings 123.

The guide body 121 may include a head seating portion 121a on which the stopper head 141 or 146 is slidably seated. The head seating portion 121a may be formed at a substantially center of the guide body 121. The head seating portion 121a may be provided corresponding in shape and/or size to the shape and/or size of the stopper heads 141 and 146.

The guide body 121 may include a shaft hollow 121b into which the support shaft 102 is inserted. The support shaft 102 may come in contact with the plurality of ball bearings 123 in the shaft hollow 121b. The shaft hollow 121b may have a diameter larger than that of the support shaft 102.

The guide body 121 may include a ball cover coupling groove 121c to which the ball cover 125 is coupled. The ball cover coupling groove 121c may be formed at an end portion of an outer circumferential surface of the guide body 121. A cover protrusion 125a of the ball cover 125 may be inserted into the ball cover coupling groove 121c. Accordingly, the ball cover 125 may be coupled to the guide body 121.

The plurality of ball bearings 123 may be rollably inserted into the plurality of ball insertion portions 122 of the guide body 121. The plurality of ball bearings 123 may perform rolling movement on the support shaft 102 while being inserted into the plurality of ball insertion portions 122.

In detail, referring to FIG. 4, the plurality of ball bearings 123 may be disposed along the outer circumferential surface of the support shaft 102 to surround the support shaft 102. The plurality of ball bearings 123 may be disposed at equal intervals along the circumferential direction of the support shaft 102. In the present embodiment, the ball bearing 123 is illustrated as including three ball bearings at each end portion of the guide body 121, but the number of ball bearings 123 is not limited thereto, and two or less ball bearings or four or more ball bearings may be provided at each end portion of the guide body 121.

The support shaft 102 may be disposed to come in contact only with the plurality of ball bearings 123. Such a configuration may minimize the frictional force generated when the divider 110 moves with respect to the storage container 100.

The plurality of ball bearings 123 may have lubricating oil on the outer surface thereof to reduce friction occurring when rolling with respect to the support shaft 102.

The ball cover 125 may cover the plurality of ball bearings 123 inserted into the plurality of ball insertion portions 122. The ball cover 125 may be coupled to the guide body 121 as the cover protrusion 125a is inserted into the ball cover coupling groove 121c of the guide body 121. As the ball cover 125 is coupled to the guide body 121, the plurality of ball bearings 123 inserted into the plurality of insertion portions 122 may not be separated from the guide body 121. The ball covers 125 may be provided at both end portions of the guide body 121, respectively.

The ball cover 125 may include a ball groove 126 that supports the plurality of ball bearings 123 to perform rolling. The ball groove 126 may be provided corresponding in number to the plurality of ball insertion portions 122.

The divider 110 may be provided with the lever 130 configured to fix the position of the divider 110 and the stopper 140. The lever 130 may be configured to move the stopper 140 by moving with respect to the divider 110.

The lever 130 may include the exposed portion 131 exposed to the outside of the divider 110, the latch protrusion 133 selectively fixed to the push latch device 116, and the push portion 135 formed to push the stopper 140 or to be pushed by the stopper 140.

The exposed portion 131, seated on the lever mounting portion 112 of the outer case 111, may be exposed to the outside of the outer case 111. When the user desires to fix the position of the divider 110, the user may press the exposed portion 131 to the inside of the divider 110.

The latch protrusion 133 may be formed to protrude to be inserted into the push latch device 116. The latch protrusion 133 may be formed to extend downward from the exposed portion 131. The latch protrusion 133, in response to the exposed portion 131 being pressed, may be inserted into the push latch device 116 to be coupled to the push latch device 116, and in response to the exposed portion 131 being pressed, being inserted into the push latch device 116, may be separated from the push latch device 116.

The push portion 135 may be formed to extend downward from the exposed portion 131. The push portions 135 may be disposed at both sides of the latch protrusion 133. The push portion 135 may be disposed to come in contact with the stopper tails 144 and 149 of the stopper 140. When the latch protrusion 133 is fixed to the push latch device 116, the push portions 135 press the stopper tails 144 and 149 to move the stopper 140 in a direction in which the stopper 140 is fixed to the fixing portion 103. When the latch protrusion 133 is separated from the push latch device 116, the push portions 135 are pressed by the stopper tails 144 and 149 to be moved upward.

The stopper 140 may be configured to be fixed to or released from the fixing portion 103. The stopper 140 includes the first stopper head 141, the first stopper shaft 142, the first stopper elastic member 143, the first stopper tail 144, the second stopper head 146, the second stopper shaft 147, the second stopper elastic member 148, and the second stopper tail 149.

The first stopper head 141 may be formed to be engaged with the first fixing portion 103a. The first stopper head 141 may have an uneven shape. The first stopper head 141 may be slidably seated on the head seating portion 121a. The first stopper head 141 may be connected to the first stopper shaft 142.

The first stopper shaft 142 may be formed to extend along the moving direction of the stopper 140. One end of the first stopper shaft 142 may be connected to the first stopper head 141. The other end of the first stopper shaft 142 may be connected to the first stopper tail 144. The first stopper elastic member 143 may be disposed at an outside of the first stopper shaft 142. The first stopper shaft 142 may be accommodated in the first stopper elastic member 143.

One end of the first stopper elastic member 143 may be fixed to the inner case 114 and the other end of the first stopper elastic member 143 may be fixed to the first stopper tail 144. The first stopper elastic member 143 may be configured to apply an elastic force to the first stopper tail 144 in a direction in which the first stopper tail 144 moves the lever 130 upward. The first stopper elastic member 143 may be disposed to apply an elastic force in a direction in which the stopper head 141 is released from the first fixing portion 103a.

The first stopper tail 144 may be connected to the first stopper shaft 142. The first stopper tail 144 may be pressed toward the movement limiting portion 117 by the first stopper elastic member 143. The first stopper tail 144 may come in contact with the push portion 135 of the lever 130.

The first stopper tail 144 may include a first guide surface 144a configured to come in contact with the push portion 135. The first guide surface 144a may be formed to be inclined with respect to the moving direction of the lever 130. The first guide surface 144a may be formed to be inclined with respect to the moving direction of the stopper 140. The first guide surface 144a may convert a force in the vertical direction of the lever 130 into a force in the horizontal direction of the stopper 140. The first guide surface 144a may convert a force in the horizontal direction of the stopper 140 into a force in the vertical direction of the lever 130.

The configurations of the second stopper head 146, the second stopper shaft 147, the second stopper elastic member 148, the second stopper tail 149, and the second guide surface 149a are the same as those of the first stopper head 141, the first stopper shaft 142, the first stopper elastic member 143, the first stopper tail 144, and the first guide surface 144a except for being arranged symmetrically with respect to the lever 130, and thus detailed descriptions thereof will be omitted.

Hereinafter, the operation of the stopper 140 will be described with reference to FIGS. 5 to 8.

Referring to FIGS. 5 and 6, when the lever 130 is not pressed, the stopper elastic members 143 and 148 press the stopper tails 144 and 149 toward the movement limiting portions 117. The stopper tails 144 and 149 may come in contact with the push portions 135 of the lever 130 and support the lever 130 upward. The latch protrusion 133 is in a state of being separated from the push latch device 116.

Referring to FIGS. 7 and 8, in a state in which the exposed portion 131 of the lever 130 is pressed, the latch protrusion 133 is coupled to the push latch device 116. The push portions 135 of the lever 130 press the stopper tails 144 and 149 of the stopper 140. The stopper tails 144 and 149 are moved in a direction in which the stopper heads 141 and 146 of the stopper 140 are fixed to the fixing portions 103. The stopper heads 141 and 146 may be fixed to the fixing portions 103 by being engaged with the fixing portions 103.

Thereafter, when the exposed portion 131 of the lever 130 is pressed while the latch protrusion 133 is inserted into the push latch device 116, the latch protrusion 133 is separated from the push latch device 116. The stopper elastic members 143 and 148 press the stopper tails 144 and 149 in a direction in which the stopper heads 141 and 146 are released from the fixing portions 103. The push portions 135 of the lever 130 are pressed by the stopper tails 144 and 149 of the stopper 140 to be moved upward.

Figure 9:
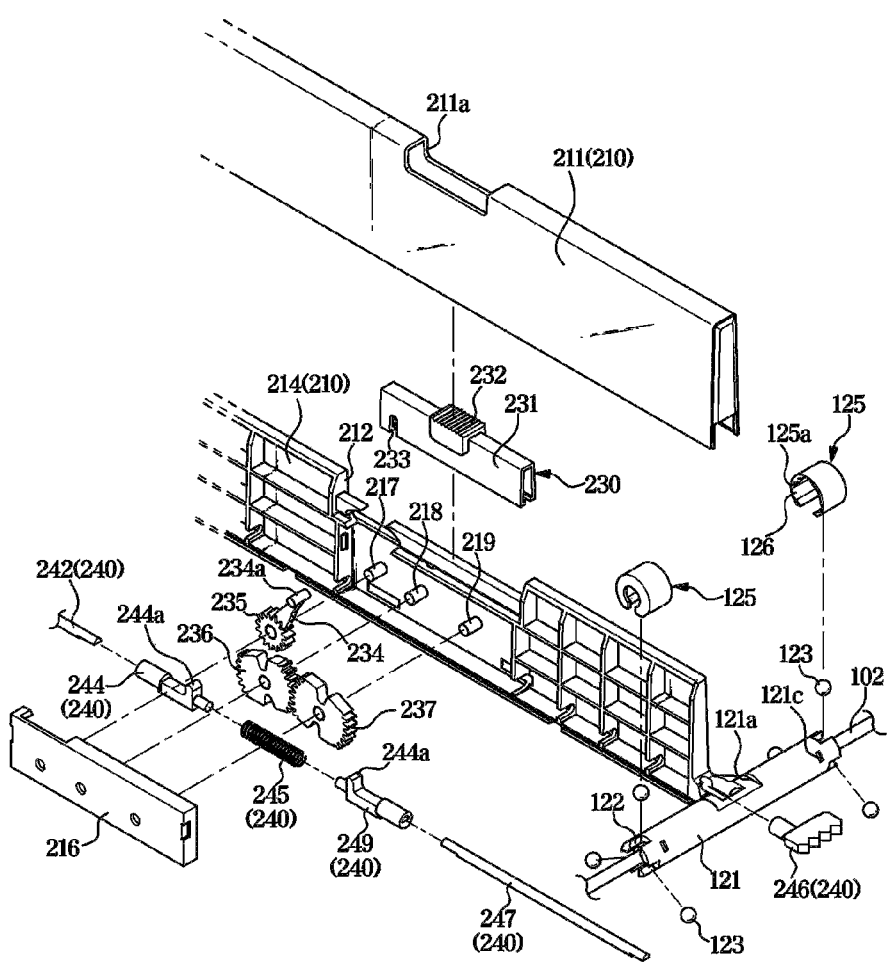
FIG. 9 is an exploded view illustrating a divider according to another embodiment.
Figure 10:
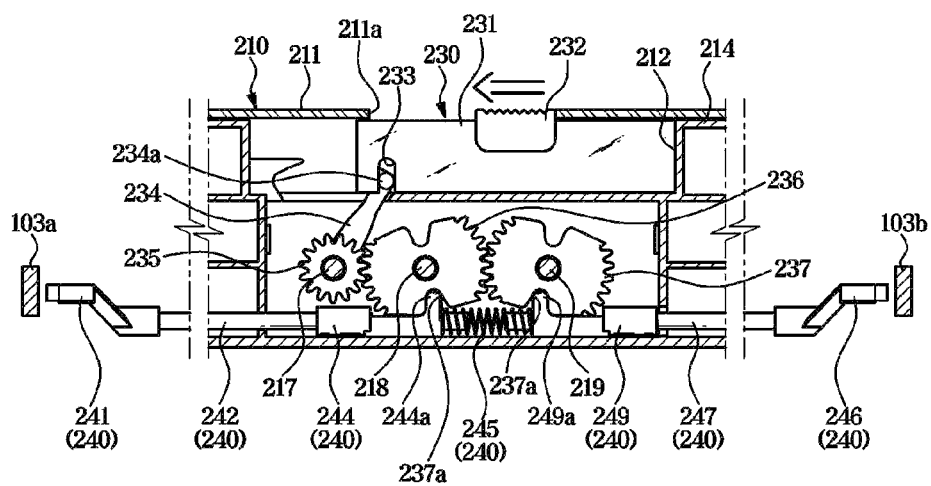
FIG. 10 is a view illustrating an internal configuration of the divider shown in FIG. 9 in a state in which the divider is released from the storage container.
Figure 11:
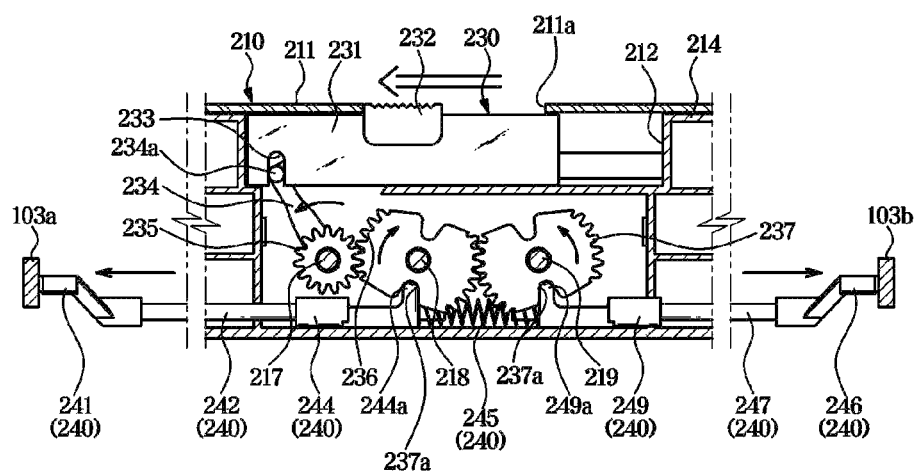
FIG. 11 is a view illustrating an internal configuration of the divider shown in FIG. 9 in a state in which the divider is fixed to the storage container.

FIG. 9 is an exploded view illustrating a divider according to another embodiment. FIG. 10 is a view illustrating an internal configuration of the divider shown in FIG. 9 when the divider is released from the storage container. FIG. 11 is a view illustrating an internal configuration of the divider shown in FIG. 9 when the divider is fixed to the storage container.

In the description of the divider with reference to FIGS. 9 to 11, the same reference numerals are assigned to the same configurations as those in the above-described embodiment shown in FIGS. 2 to 8, and detailed descriptions thereof may be omitted.

A divider 210 may be provided to be movable with respect to the storage container 100 to partition the storage space 101. The divider 210 may include an outer case 211 and an inner case 214.

The outer case 211 may be provided to cover the inner case 214. The outer case 211 may include a lever mounting portion 211a on which an exposed portion 232 of a lever 230 is movably mounted.

The lever mounting portion 211a may be formed such that the exposed portion 232 of the lever 230 is exposed to the outside of the outer case 211 in a state in which the lever 230 is mounted on the lever mounting portion 211a. The lever mounting portion 211a may be formed to guide the sliding movement of the lever 230. The lever mounting portion 211a may be formed to extend along the direction in which the outer case 211 extends.

The inner case 214 may be accommodated in the outer case 211. The inner case 214 may include a lever seating portion 212 on which the lever 230 is slidably seated, a first coupling portion 217 to which a first gear 235 is coupled, and a second coupling portion 218 to which a second gear 236 is coupled, and a third coupling portion 219 to which a third gear 237 is coupled.

The lever seating portion 212 may be formed to allow the lever 230 to be slidably coupled thereto. The lever seating portion 212 may guide the lever 230 so that the lever 230 moves along the direction in which the divider 210 extends.

The first coupling portion 217 may rotatably support the first gear 235. The second coupling portion 218 may rotatably support the second gear 236. The third coupling portion 219 may rotatably support the third gear 237.

The configuration of the guide device 120 is the same as that described in the above embodiment shown in FIGS. 2 to 8, so detailed descriptions thereof will be omitted.

The divider 210 may include the lever 230 configured to fix the position of the divider 210, and a stopper 240. The lever 230 may be configured to move the stopper 240 by moving with respect to the divider 210.

The lever 230 may include a lever body 231, the exposed portion 232 exposed to the outside of the divider 210, and an insertion groove 233 into which an end portion 234a of a connection shaft 234 is rotatably inserted.

The lever body 231 may be provided to be slidably seated on the lever seating portion 212. The lever body 231 may be formed to extend along the direction in which the inner case 214 extends.

The exposed portion 232 may be disposed on the upper side of the lever body 231. The exposed portion 232 may be pressed by a user when the user operates the lever 230. The exposed portion 232 may have an uneven shape so as to generate a frictional force when the exposed portion 232 is pressed by a user.

The insertion groove 233 may be formed to allow the end portion 234a of the connection shaft 234 to be rotatably inserted thereinto. When the lever 230 slides, the insertion groove 233 may remain in a state of being coupled to the end portion 234a of the connection shaft 234.

Power transmission devices 234, 235, 236, and 237 may be provided inside the inner case 214. The power transmission devices 234, 235, 236, and 237 may transmit the driving force of the lever 230 to the stopper 240 so that the stopper 240 moves. In detail, the power transmission devices 234, 235, 236, 237 may be configured to move the stopper 240 in a direction to be fixed to the fixing portion 103 when the lever 230 moves in a first direction, and move the stopper 240 in a direction to be released from the fixing portion 103 when the lever 230 moves in a second direction opposite to the first direction. The power transmission devices 234, 235, 236, and 237 may include the connection shaft 234, the first gear 235, and a gear module 236 and 237.

The connection shaft 234 may be formed to extend from the first gear 235. The end portion 234a of the connection shaft 234 may be rotatably inserted into the insertion groove 233.

The first gear 235 is provided to rotate according to the movement of the lever 230. The first gear 235 may be disposed at an end portion of the connection shaft 234. The first gear 235 may be rotatably coupled to the first coupling portion 217. The first gear 235 may be rotated as the end portion 234a of the connection shaft 234 coupled to the lever 230 moves together with the lever 230. The end portion 235a of the connection shaft 234a may be rotate and moved while being inserted into the insertion groove 233 of the lever 230.

The gear modules 236 and 237 may engage with and rotate relative the first gear 235. The gear module 236 and 237 may be connected to the stopper 240 to move the stopper 240. The gear modules 236 and 237 may include the second gear 236 and the third gear 237.

The second gear 236 may be rotatably coupled to the second coupling portion 218. The second gear 236 may engage with and rotate relative to the first gear 235 to move the first stopper head 241 in a direction to be fixed to or released from the first fixing portion 103a. The second gear 236 may transmit a force to the first stopper head 241.

The second gear 236 may include a first gear groove 236a. The first gear groove 236a may be coupled to a first guide protrusion 244a of the first stopper tail 244 to transmit a force to the first stopper tail 244.

The third gear 237 may be rotatably coupled to the third coupling portion 219. The third gear 237 may engage with and rotate relative to the second gear 236 to move the second stopper head 246 in a direction to be fixed to or released from the second fixing portion 103b. The third gear 237 may transmit a force to the second stopper head 246.

The third gear 237 may include a second gear groove 237a. The second gear groove 237a may be coupled to a second guide protrusion 249a of the second stopper tail 249 to transmit a force to the second stopper tail 249.

The first gear 235, the second gear 236, and the third gear 237 may be covered by a gear cover 216.

The stopper 240 may be configured to be fixed to or released from the fixing portion 103. The stopper 240 may include a first stopper head 241, a first stopper shaft 242, a first stopper tail 244, a second stopper head 246, a second stopper shaft 247, a second stopper tail 249, and a support elastic member 245.

The first stopper head 241 may be formed to be engaged with the first fixing portion 103a. The first stopper head 241 may be connected to the first stopper shaft 242.

The first stopper shaft 242 may extend along the moving direction of the stopper 240. One end of the first stopper shaft 242 may be connected to the first stopper head 241. The other end of the first stopper shaft 242 may be connected to the first stopper tail 244.

The first stopper tail 244 may be connected to the first stopper shaft 242. The first stopper tail 244 may be pressed in a direction away from the second stopper tail 244 by the support elastic member 245.

The first stopper tail 244 may include the first guide protrusion 244a. The first guide protrusion 244a may be inserted into the first gear groove 236a and moved as the second gear 236 rotates.

The configurations of the second stopper head 246, the second stopper shaft 247, the second stopper tail 249, and the second guide protrusion 249a are the same as those of the first stopper head 241, the first stopper shaft. 242, the first stopper tail 244, and the first guide protrusion 244a, except for being arranged symmetrically with respect to the lever 230, so detailed descriptions thereof will be omitted.

The operation of the stopper 240 will be described with reference to FIGS. 10 and 11.

Referring to FIG. 10, when the user desires to move the divider 210, the user may move the lever 230 to the right such that the stopper 240 is separated from the fixing portion 103. As the exposed portion 232 of the lever 230 is moved, the lever body 231 is moved. As the lever body 231 is moved, the first gear 235 is rotated clockwise by the connection shaft 234. As the first gear 235 rotates clockwise, the second gear 236 is rotated counterclockwise, and the third gear 237 is rotated clockwise. As the second gear 236 rotates counterclockwise, the first stopper tail 244, the first stopper shaft 242, and the first stopper head 241 are moved in a direction away from the first fixing portion 103a. As the third gear 237 rotates clockwise direction, the second stopper tail 249, the second stopper shaft 247, and the second stopper head 246 are moved in a direction away from the second fixing portion 103b.

Referring to FIG. 11, when a user desires to fix the position of the divider 210, the user releases a force applied to the exposed portion 232 of the lever 230. The support elastic member 245 applies a force to the first stopper tail 244 and the second stopper tail 249 in a direction that the first stopper tail 244 and the second stopper tail 249 move away from each other. Accordingly, the first stopper head 241 is fixed to the first fixing portion 103a, and the second stopper head 246 is fixed to the second fixing portion 103b. The second gear 236 rotates clockwise, and the third gear 237 rotates counterclockwise. The first gear 235 rotates counterclockwise. The lever body 231 is slid to the left by the connection shaft 234.

Although the air conditioner has been described by way of embodiments in relation to a specific shape and direction, the above embodiments are illustrative purpose only, and it would be appreciated by those skilled in the art that changes and modifications may be made in these embodiments without departing from the principles and scope of the disclosure, the scope of which is defined in the claims and their equivalents.

The invention claimed is:

1. A refrigerator comprising:
   a main body provided to form a storage chamber;
   a storage container configured to be inserted into or withdrawn from the storage chamber, and having a storage space;
   a divider configured to be movable with respect to the storage container to divide the storage space;
   a support shaft arranged in the storage container and configured to guide movement of the divider;
   a fixing portion arranged on an inner side surface of the storage container;
   a stopper configured to be fixed to or released from the fixing portion;
   a lever configured to move the stopper by being moved with respect to the divider; and
   a guide device configured to movably support the divider, and including:
      a plurality of ball bearings arranged along an outer circumferential surface of the support shaft to surround the support shaft and to roll with respect to the support shaft.

2. The refrigerator of claim 1, wherein the guide device includes a first guide device arranged at one end of the divider and a second guide device disposed at an other end opposite to the one end of the divider.

3. The refrigerator of claim 1, wherein the guide device includes:
   a guide body formed to extend along a moving direction of the divider and having a plurality of ball insertion portions into which the plurality of ball bearings are inserted; and
   a ball cover coupled to the guide body to cover the plurality of ball bearings inserted into the plurality of ball insertion portions.

4. The refrigerator of claim 1, wherein a lubricating oil is provided on outer surfaces of the plurality of ball bearings or an outer surface of the support shaft.

5. The refrigerator of claim 1, wherein the fixing portion extends in a same direction as a direction in which the support shaft extends.

6. The refrigerator of claim 1, wherein:
   the divider includes a push latch device configured to be selectively coupled to the lever, and
   the lever is configured to:
      when coupled to the push latch device, move the stopper in a direction to be fixed to the fixing portion; and
      when separated from the push latch device, move the stopper in a direction to be released from the fixed portion.

7. The refrigerator of claim 6, wherein the lever includes:
   a latch protrusion formed to protrude to be inserted into the push latch device; and a push portion configured to come in contact with a portion of the stopper to press the stopper or be pressed by the stopper.

8. The refrigerator of claim 6, further comprising a stopper elastic member arranged to apply an elastic force to the stopper in a direction in which the stopper is released from the fixing portion.

9. The refrigerator of claim 1, wherein:
the divider includes a power transmission device configured to transmit a driving force of the lever to the stopper,
the lever is provided to be movable along a direction in which the divider extends, and
the power transmission device is configured to:
move the stopper in a direction to be fixed to the fixing portion when the lever moves in a first direction, and
move the stopper in a direction to be released from the fixing portion when the lever moves in a second direction opposite to the first direction.

10. The refrigerator of claim 9, wherein the power transmission device includes:
a first gear provided to rotate according to movement of the lever; and
a gear module configured to engage with and rotate relative to the first gear, and connected to the stopper to move the stopper.

11. The refrigerator of claim 10, wherein the stopper includes a first stopper head arranged at one end of the divider and a second stopper head arranged at an other end opposite to the one end of the divider, and
the fixing portion includes a first fixing portion arranged to face the first stopper head and a second fixing portion arranged to face the second stopper head,
wherein a second gear module includes:
a second gear configured to engage with and rotate relative to the first gear to transmit a force to the first stopper head to move the first stopper head in a direction to be fixed to or released from the first fixing portion; and
a third gear configured to engage with and rotate relative to the second gear to transmit a force to the second stopper head to move the second stopper head in a direction to be fixed to or released from the second fixing portion.

12. The refrigerator of claim 11, further comprising a support elastic member arranged to apply an elastic force to the first stopper head and the second stopper head in a direction in which the first stopper head and the second fixing portion, respectively.

* * * * *